(12) United States Patent
Redko et al.

(10) Patent No.: US 10,761,941 B1
(45) Date of Patent: Sep. 1, 2020

(54) CHANGED BLOCKS TRACKING METHODS AND SYSTEMS FOR WRITABLE SNAPSHOTS

(71) Applicant: Acronis International GmbH, Shaffhausen (CH)

(72) Inventors: Andrei Redko, Moscow (RU); Stanislav Protasov, Moscow (RU); Serguei M. Beloussov, Costa Del Sol (SG)

(73) Assignee: ACRONIS INTERNATIONAL GMBH (CH)

( * ) Notice: Subject to any disclaimer, the term of this patent is extended or adjusted under 35 U.S.C. 154(b) by 0 days.

(21) Appl. No.: 14/985,323

(22) Filed: Dec. 30, 2015

Related U.S. Application Data

(63) Continuation-in-part of application No. 14/502,959, filed on Sep. 30, 2014, now Pat. No. 9,875,041.

(60) Provisional application No. 62/098,433, filed on Dec. 31, 2014.

(51) Int. Cl.
| | |
|---|---|
| *G06F 12/00* | (2006.01) |
| *G06F 11/14* | (2006.01) |
| *G06F 16/11* | (2019.01) |
| *G06F 3/06* | (2006.01) |

(52) U.S. Cl.
CPC .......... *G06F 11/1451* (2013.01); *G06F 3/065* (2013.01); *G06F 16/128* (2019.01); *G06F 2201/84* (2013.01)

(58) Field of Classification Search
CPC .......... G06F 11/1451; G06F 17/30088; G06F 2201/84; G06F 3/065
See application file for complete search history.

(56) References Cited

U.S. PATENT DOCUMENTS

| | | |
|---|---|---|
| 7,047,380 B2 | 5/2006 | Tormasov et al. |
| 7,246,211 B1 | 7/2007 | Beloussov et al. |
| 7,275,139 B1 | 9/2007 | Tormasov et al. |
| 7,281,104 B1 | 10/2007 | Tsypliaev et al. |
| 7,318,135 B1 | 1/2008 | Tormasov et al. |
| 7,353,355 B1 | 4/2008 | Tormasov et al. |
| 7,366,859 B2 | 4/2008 | Per et al. |
| 7,475,282 B2 | 1/2009 | Tormasov et al. |
| 7,603,533 B1 | 10/2009 | Tsypliaev et al. |
| 7,636,824 B1 | 12/2009 | Tormasov |
| 7,650,473 B1 | 1/2010 | Tormasov et al. |
| 7,721,138 B1 | 5/2010 | Lyadvinsky et al. |
| 7,779,221 B1 | 8/2010 | Tormasov et al. |
| 7,831,789 B1 | 11/2010 | Tsypliaev et al. |

(Continued)

Primary Examiner — Shawn X Gu
(74) Attorney, Agent, or Firm — K&L Gates LLP

(57) ABSTRACT

Various examples are directed to systems and methods for backing up data. A tracking utility may receive a start request and then enter a holding mode until a first modifiable or writable snapshot is created. The tracking utility can track such a first snapshot and determine if any modifications such as writes have been made to the first snapshot. If the first snapshot has not been modified it can be backed up using a read only snapshot scheme. If the first snapshot has been modified, a record of the modifications thereto are used to update the frozen changes and the current changes. The resulting or finalized snapshot is generated and includes all of the modifications, modifications 1 to N made to the first snapshot. This process can be repeated for one or more or all of the modifiable or writable snapshots.

13 Claims, 12 Drawing Sheets

(56) References Cited

U.S. PATENT DOCUMENTS

| | | |
|---|---|---|
| 7,886,120 B1 | 2/2011 | Tormasov |
| 7,895,403 B1 | 2/2011 | Tormasov et al. |
| 7,934,064 B1 | 4/2011 | Per et al. |
| 7,937,612 B1 | 5/2011 | Tormasov et al. |
| 7,949,635 B1 | 5/2011 | Korshunov et al. |
| 7,953,948 B1 | 5/2011 | Dyatlov et al. |
| 7,979,690 B1 | 7/2011 | Dyatlov et al. |
| 8,005,797 B1 | 8/2011 | Chepel et al. |
| 8,051,044 B1 | 11/2011 | Dyatlov et al. |
| 8,069,320 B1 | 11/2011 | Per et al. |
| 8,073,815 B1 | 12/2011 | Korshunov et al. |
| 8,074,035 B1 | 12/2011 | Per et al. |
| 8,145,607 B1 | 3/2012 | Korshunov et al. |
| 8,180,984 B1 | 5/2012 | Per et al. |
| 8,225,133 B1 | 7/2012 | Tormasov et al. |
| 8,261,035 B1 | 9/2012 | Tormasov et al. |
| 8,296,264 B1 | 10/2012 | Dyatlov et al. |
| 8,312,259 B1 | 11/2012 | Dyatlov et al. |
| 8,347,137 B1 | 1/2013 | Chepel et al. |
| 8,484,427 B1 | 7/2013 | Lyadvinsky et al. |
| 8,645,748 B1 | 2/2014 | Chepel et al. |
| 8,732,121 B1 | 5/2014 | Zarin_ et al. |
| 8,856,927 B1 | 10/2014 | Beloussov et al. |
| 8,996,830 B1 | 3/2015 | Lyadvinsky et al. |
| 9,384,008 B1 * | 7/2016 | Mantri .................... G06F 9/441 |
| 2006/0155946 A1 * | 7/2006 | Ji .......................... G06F 3/0617 |
| | | 711/162 |
| 2006/0225065 A1 | 10/2006 | Chandhok et al. |
| 2010/0011178 A1 | 1/2010 | Feathergill |

\* cited by examiner

CHANGED BLOCKS TRACKING METHODS AND SYSTEMS FOR WRITABLE SNAPSHOTS

CROSS-REFERENCE TO RELATED APPLICATIONS

This application claims priority to and the benefit of U.S. Provisional Patent Application No. 62/098,433 filed on Dec. 31, 2014, and is a continuation in part of U.S. patent application Ser. No. 14/502,959 filed on Sep. 30, 2014, the disclosures of both applications are herein incorporated by reference in their entirety.

TECHNICAL FIELD

The technical field may generally relate to data backup and more particularly to synchronizing change tracking in data backup applications.

BACKGROUND

Snapshots or shadow copies are commonly used to recreate the state of data storage volumes or other data constructs. A snapshot is a record of the state of a volume or other data construct at a particular time e.g., a snapshot time. Snapshots are commonly used to create backup copies of data storage volumes. Different techniques are used for different types of snapshots. For example, some snapshots are a complete copy of the volume. A backup client creates a backup copy of the volume, then, by transferring the complete copy snapshot to a secure data storage location. Some snapshots are differential and include only the data blocks of a volume that have changed since the snapshot time. For snapshots of this kind, the backup client creates the backup copy by copying the snapshot as well as any data blocks from the volume that are not represented in the snapshot (i.e., those data blocks that have not been modified since the snapshot time).

Creating a full backup copy of a volume using a snapshot or other mechanism often requires considerable system resources and can take an undesirably long time. For example, a complete copy snapshot must be read and copied to a secure backup storage location. When a differential snapshot is used, the backup copy must be recreated from the snapshot and the in-use volume. Backup can be streamlined by using differential or incremental backup techniques. According to differential techniques, a full backup copy of a volume is created, for example, from a snapshot of the volume. After the full backup copy is created, one or more differential backup copies are created with reference to the full backup copy. Each differential backup copy includes only data blocks that have been modified since the last full backup copy was created. The backed-up volume can be restored, then, by applying the full backup copy and the most recent differential backup copy. Incremental techniques also utilize a full backup copy. A first incremental backup copy is generated including data blocks that have been modified since the full backup copy was created. Subsequent incremental backup copies include data blocks that have been modified since the most recent incremental backup copy was created. In this way, each incremental backup copy is referenced either to the full backup copy (e.g., the first incremental backup copy) or to a prior incremental backup copy.

Both differential and incremental backup techniques require the backup client to identify data blocks that have changed since the creation of a prior backup copy. This can be accomplished by comparing a hash or checksum of each data block on the volume to a hash of checksum of the equivalent location in the prior backup copy. This process is often computationally expensive as the entire volume must be read to determine which data blocks have changed.

BRIEF SUMMARY

The invention relates to computer implemented systems for backing up data. In some embodiments, the invention includes at least one processor and an operatively associated storage device. The at least one processor is programmed to: execute an application; execute a file system driver; and execute a file system filter driver. The file system filter driver is programmed to perform any or all of the following steps: receive a start request; receive a write input/output (I/O) request from the application; record to an address of a block to be modified by the write I/O request; forward the write I/O request to the file system driver; receive a lock request; determine that the lock request is the first lock request received since receipt of the start request; copy the current changes to frozen changes; clear the current changes; receive a second lock request; and discard current changes after initiating the merger.

In some embodiments, the file system filter driver is further programmed to: receive a plurality of write I/O requests from the application; and, for each of the plurality of I/O requests, record to the current changes an address to be modified by the write I/O request.

In some embodiments, the file system filter driver is further programmed to receive a request to view the frozen changes; return the frozen changes; and clear the frozen changes.

In some embodiments, the merger of the current changes is accomplished by determining that the address of the block to be modified is not indicated in the frozen changes; and indicating the address in the frozen changes.

In some embodiments, the lock request is received from a snapshot utility, and the lock request indicates that the snapshot utility is to begin a snapshot of at least a portion of the storage device.

In some embodiments, the system includes one or more memory devices wherein changes and frozen changes can be stored and accessed.

In some embodiments, the at least one processor is programmed to execute a file system driver; and execute a tracking utility. The tracking utility is programmed to perform any or all of the following steps: receive a start request; receive a write request directed towards the first volume; record to a current changes list an address at the volume to be modified by the write request; receive a lock request; determine that the lock request is the first lock request received since receipt of the start request; copy the current changes list to a frozen changes list; clear the current changes list; receive a second lock request; and merge the current changes list and the frozen changes list.

In some embodiments, the tracking utility is further programmed to forward the write request to the file system driver associated with the first volume.

In some embodiments, the tracking utility is further programmed to, after clearing the current changes list and before receiving the second lock request, receive a plurality of write requests directed towards the volume; and, for each of the plurality of write requests, record to the current changes list an address at the volume to be modified by the write request.

In some embodiments, the tracking utility is further programmed to: receive from a backup client a request to view the frozen changes list; in response to the request, return the frozen changes list; and, after returning the frozen changes list, clear the frozen changes list.

In some embodiments, merging the current changes list and the frozen changes list includes comparing data block addresses from the current changes list to data block addresses from the frozen changes list; and writing to the frozen changes list data block addresses from the current changes list that were not also on the frozen changes list.

In some embodiments, the lock request is received from a snapshot utility, and the lock request indicates that the snapshot utility is to begin a snapshot of the volume.

In some embodiments, the system includes one or more memory devices wherein changes and frozen changes can be stored and accessed.

In some embodiments, the at least one processor is programmed to execute a backup client. The backup client, in turn, is programmed to perform any or all of the following steps: initiate a tracking utility at a first time; request a first snapshot of the first volume; generate a first backup copy of the first volume from the first snapshot; request a second snapshot of the first volume; stop the tracking utility; receive from the tracking utility a list comprising changes to the first volume between the first time and a time of a last snapshot of the volume taken before the tracking utility is stopped; and generate a second backup copy of the first volume from the second snapshot considering the list.

In some embodiments, the tracking utility is further programmed to: receive a start request from the backup client at the first time; after receiving the start request, receive a plurality of write requests directed to the first volume; for each of the plurality of write requests, record to a current changes list an address at the volume to be modified by the write request; receive a first lock request after receiving the start request; after receiving the first lock request, copy the current changes list to a frozen changes list; clear the current changes list; receive a second lock request; and merge the current changes list and the frozen changes list.

In some embodiments, the tracking utility is further programmed to provide the frozen changes list to the backup client as the list.

In some embodiments, the lock request is received from a snapshot utility, and the lock request indicates that the snapshot utility is to begin a snapshot of the volume.

In some embodiments, the tracking utility is further programmed to forward each of the plurality of write requests to the file system driver associated with the first volume.

In some embodiments, the tracking utility includes a file system filter driver.

In some embodiments, merging the current changes list and the frozen changes list includes: comparing data block addresses from the current changes list to data block addresses from the frozen changes list; and writing to the frozen changes list data block addresses from the current changes list that were not also on the frozen changes list.

In an embodiment, a method for backing up data may include initiating tracking changes to the data with a changed block tracker utility. The method may further include sending, via a backup agent, a command to a volume snapshot service subsystem to create a snapshot of the data. The method may also include receiving a notification at the changed block tracker utility that a new writable snapshot has been created. Additionally, the method may include creating a dedicated filter driver to track any changes to the writable snapshot.

One or more of the following features may be included. The method may include performing the initiating, sending, receiving, and creating operations for a series of different snapshots. The method may also include tracking changes in all the snapshots and sending the changes to frozen changes and current changes. The method may additionally include tracking changes in all the snapshots and sending the changes to a collection of changes. In response to receiving a name of a proper snapshot at the backup agent, the method may include deleting the unnecessary changes collected. Moreover, the method may include, after creation of a backup copy based on a corresponding backup, removing the frozen changes. The changed block tracker utility may be a volume filter driver for performing a block or sector backup. The changed block tracker utility may be a file system filter driver for performing a file-level backup. The dedicated filter driver to track any changes to the writable snapshot may be a volume filter driver. The dedicated filter driver to track any changes to the writable snapshot may be a file system filter driver.

DESCRIPTION

Figure 1:
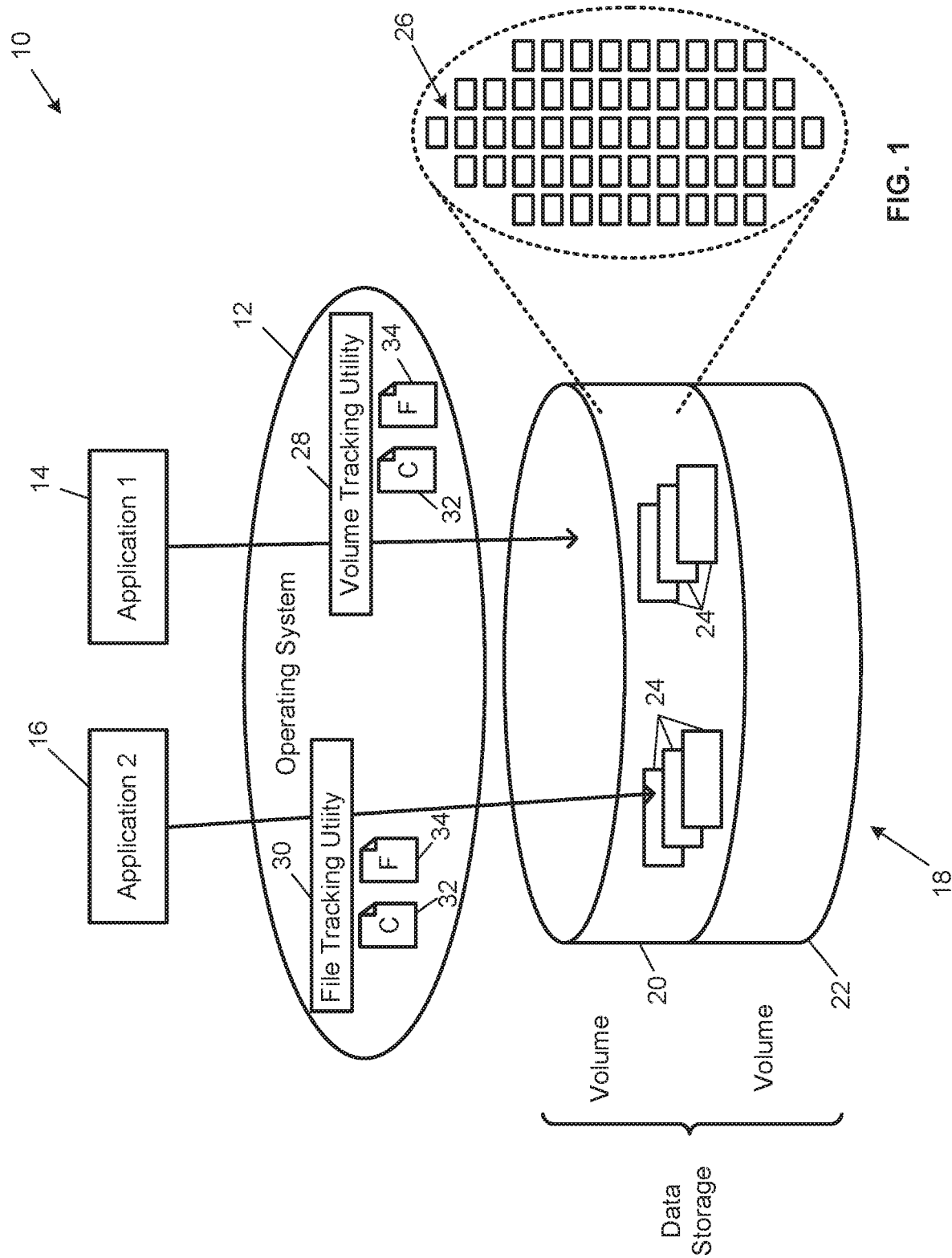
FIG. 1 is a logical block diagram showing one embodiment of a system architecture of a computer system that may be used to synchronize change tracking with snapshot creation.

Various examples are directed to systems and methods for synchronizing change tracking with snapshot creation to facilitate data backup. To implement incremental or differential backup, a backup client needs to know which data blocks at a target volume or other data structure have been modified since the time of a reference backup copy. For example, the backup client needs to know the data blocks that are modified between the snapshot time of the snapshot used to create the backup copy and the snapshot time of a snapshot that will be used to create a current backup copy. In various embodiments, this can be determined by monitoring lock requests and input/output (I/O) requests directed to volume. Lock requests are instructions to a volume or an associated driver to place the volume in a read-only state. For example, a snapshot utility may direct a lock request to a volume or its driver before taking a snapshot in order to ensure that the volume remains consistent while the snapshot is created. The backup client may identify the data blocks of the volume that have been modified since the reference copy by examining the I/O requests (e.g., write requests) directed to the volume since the lock request corresponding to the snapshot used to create the reference backup copy.

In many computer systems, however, the backup client is not the only application that can request a snapshot. Other applications may also utilize snapshots including, for example, management applications for managing snapshots, fast recovery applications, etc. Further, in a many computer systems, a lock request does not indicate the application that requested the associated snapshot. This means that the backup client may not be able to determine whether any given lock request is associated with its own snapshot request or a snapshot request from another application. Accordingly, the backup client may be configured to synchronize change tracking with requested snapshots.

In various examples, a tracking utility is used to track I/O requests and lock requests directed towards a volume or other data construct. Requests to the volume, including I/O requests and lock requests, may be routed to the tracking utility. The tracking utility may track I/O requests that change the volume in relation to lock requests to generate a list of volume changes since the snapshot time associated with the reference backup copy. The tracking utility may maintain two lists of changes to the volume, a current changes list and a frozen changes list. When lock tracking begins, the tracking utility tracks I/O requests that modify data blocks at the volume. Changes to the volume, as indicated by the I/O request, are written to the current changes list. When a first lock request is received, the changes recorded to the current changes list are transferred to the frozen changes list and the current changes list is cleared. Subsequent changes are recorded to the current changes list. When a second and subsequent lock requests are received, the current changes list and the frozen changes list are merged. Accordingly, upon receiving the second and subsequent lock requests, the frozen changes list may include a list of changes to the volume between the time that tracking began and the time of the most recent lock request. When lock tracking ends, the frozen changes list may be provided to the backup client. In various examples, the backup client may initiate the tracking utility before it creates the reference backup copy. The backup client may terminate the tracking utility after its snapshot request for the next incremental backup copy is processed. Accordingly, the frozen changes list may include a list of changes between a point in time before the snapshot time of the reference backup copy and a point in time that is at least as late as the snapshot time for the next incremental backup copy.

FIG. 1 is a logical block diagram showing one embodiment of a system architecture 10 of a computer system that may be used to synchronize change tracking with snapshot creation. The architecture 10 may be executed on any suitable computer or computer system, for example, as described herein. The architecture 100 may be implemented on any suitable type of computer hardware. For example, the architecture 100 may be implemented on a computer device comprising a central processing unit (CPU) or other processor, random access memory, persistent storage (e.g., hard drive, solid state drive (SSD), etc. A block diagram of an example implementing computer system for the architecture 100 is provided and described below with respect to FIG. 8.

The architecture 10 comprises an operating system 12, one or more applications 14, 16, and a data storage 18. The data storage 18, for example, may correspond to a physical disk or other storage device that may be local or remotely accessible via a network. In some embodiments, the data storage 18 may comprise multiple storage devices in communication with one another via any suitable bus or network such as, for example, a storage area network (SAN). The data storage 18 may be organized into one or more volumes 20, 22. Each volume 20, 22 may represent a logical drive or other identifiable storage area. For example, each volume 20, 22 may have a distinct logical unit number (LUN). Each volume 20, 22 comprise data blocks 26. Data blocks 26 may represent units of data stored at the volume 20, 22. In some computer systems, data blocks 26 correspond to physical sectors a disk or other data storage hardware component, although data blocks 26 may also be logical constructs that are translated to hardware locations by an appropriate driver. Data blocks 26 may be of any suitable size such as, for example, 512 bytes, 520 bytes, 1024 bytes, etc. Data blocks 26 on a volume 20, 22 may be organized into any suitable data construct including, for example, as files 24, directories, databases, etc.

Applications 14, 16 may be executed to perform at least one task such as, for example, providing e-mail service, providing word processing, providing financial management services, etc. Applications 14, 16 may perform tasks by manipulating data, which may be retrieved from the data storage 18. For example, an application 14, 16 may direct an I/O request to the operating system 12. The I/O request may be a read request where the application 14, 16 asks to receive data blocks 26 stored at the data storage 18. The I/O request may also be a write request where the application 14, 16 asks to modify data blocks 26 at the data storage 18, for example, by writing over a data block or writing a new value to a blank data block. The operating system 12 may direct the I/O request to the data storage 18. The operating system 12 may also direct lock requests to the data storage 18 and/or a volume 20, 22 thereof, for example, when a snapshot of a volume 20, 22 or other data structure is requested. Lock requests may be formatted according to any suitable protocol or syntax. For example, when a MICROSOFT WINDOWS operating system 12 is used, lock requests may take the form of IOCTL VOLSNAP FLUSH AND HOLD WRITES control codes. The architecture 10 may also comprise one or more tracking utilities 28, 30. Tracking utilities 28, 30 may track I/O requests and lock requests directed to the volumes 20, 22, as described herein. In some examples, tracking utilities 28, 30 may be called by other architecture components, such as a backup client as described herein. Tracking utilities 28, 30 may be configured to track a particular data construct such as a volume 20, 22 (volume tracking utility 28) or a file (file tracking utility 30). Each tracking utility 28, 30 may keep a current changes list 32 and a frozen changes list 34 for each volume 20, 22 or other data structure that it tracks.

Figure 2A:
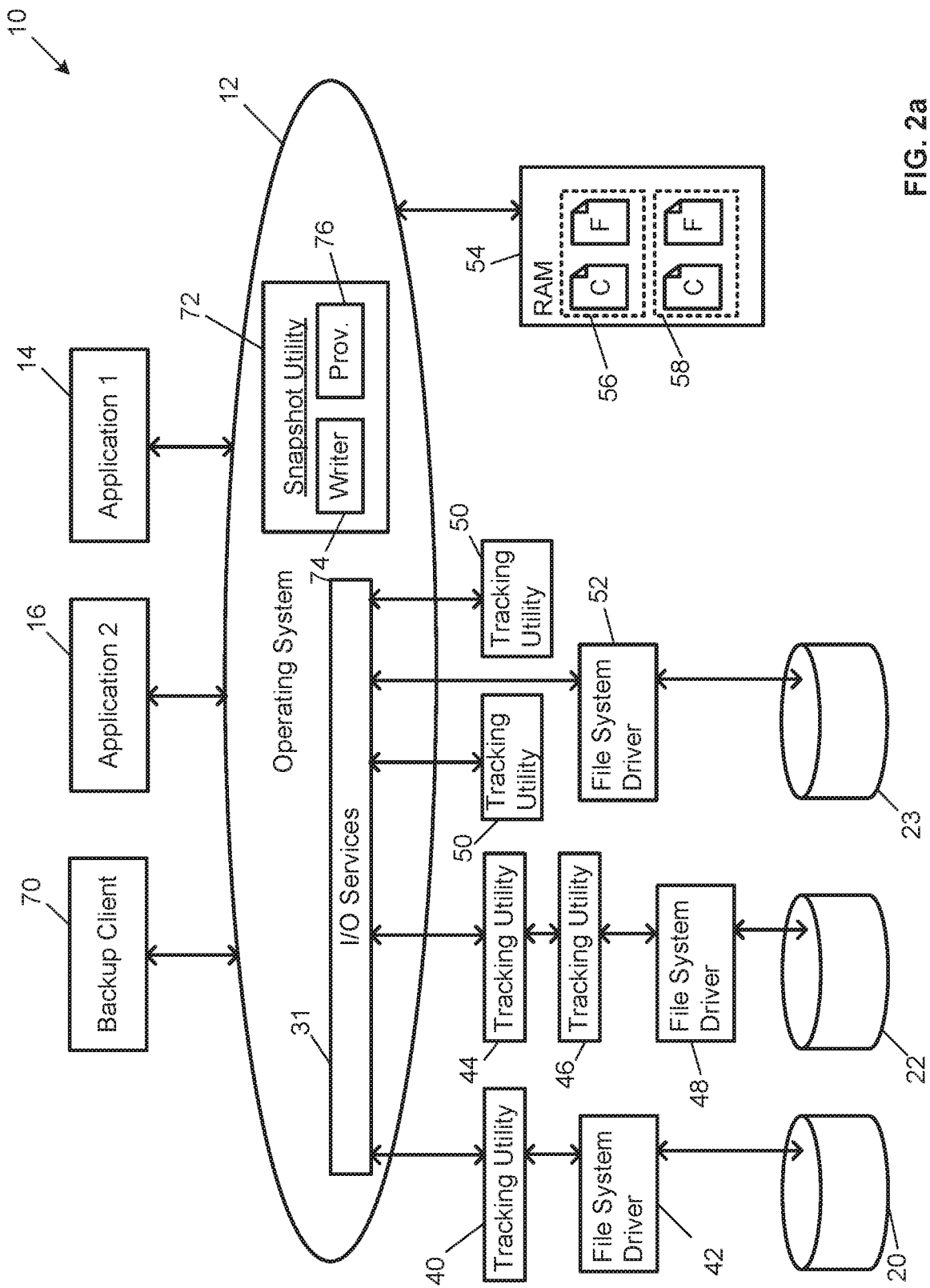
FIG. 2a is a logical block diagram showing another embodiment of the architecture 10 of FIG. 1 including additional optional features.

FIG. 2*a* is a logical block diagram showing another embodiment of the architecture 10 of FIG. 1 including additional optional features. Random access memory or RAM 54 may be used by various architecture components to store data. For example, tracking utilities may store the changes lists 30, 32 at RAM 54. An I/O services component 31 may be executed by the operating system 12 to manage I/O requests to and from the applications and volumes 20, 22, 23. When an application 14, 16 directs an I/O request to one of the volumes 20, 22, 23, it may be directed to the I/O services component 31. In response to the request, the I/O services component 31 may generate an I/O request package that is directed to the appropriate volume 20, 22, 23, often via a file system driver 42, 48, 52 of the volume. In one embodiment, the input/output (I/O) services component is a software application.

The snapshot utility 72 may be utilized to create snapshots of a volume 20, 22, 23 or other data construct. In some embodiments, the snapshot utility 72 may be a volume shadow copy (VSS) or VSS service executed by the operating system 12. Various applications 16, 14, 70 in the architecture 10 may direct a snapshot request to the snapshot utility 72. Although various examples herein refer to a snapshot of a volume, snapshots may also be requested for any other logical data construct on a volume such as a file, directory, database, etc. The utility 72 may comprise one or more writers 74 and one or more providers 76. When a snapshot request is received, the snapshot utility 72 may deploy a writer to prepare the target volume for the snapshot. For example, writers 74 may request that applications utilizing the target volume flush their buffers and/or write data stored at the RAM 54 to the disk. In this way the physical state of the volume or other data construct may match its logical state at the time a snapshot is taken. Writers 74 may also direct a lock request to the volume while the snapshot is taken. For example, the lock request may be directed to the I/O services component 31. Providers 76 may create snapshots. Providers 76 may be implemented by the operating system 12, as illustrated in FIG. 2*a*, or by any other component of the architecture 10. For example, some data storage devices 18 may implement providers that can take hardware-implemented snapshots. Also, snapshot providers may be executed by file systems and/or non-operating system applications.

FIG. 2*a* also illustrates several different configurations for tracking utilities 40, 44, 46, 50. For example, tracking utility 40 may be configured to track I/O requests and lock requests to the volume 20 and/or a data construct stored at the volume 20. The tracking utility 40 may be implemented as a file system filter driver, layered file system, or other similar arrangement. For example, the tracking utility 40 may be in communication with the operating system 12 (e.g., the I/O services component 31). I/O requests and/or lock requests from the I/O services component 31 may be directed to the tracking utility 40. The tracking utility 40 may process the requests, as described herein. The tracking utility 40 may also forward received I/O requests and/or lock requests to a file system driver 42 associated with the volume 20. The file system driver 42 may execute the request at the volume 20. Responses to the requests may also be routed to the I/O services component 31 via the tracking utility 40.

Tracking utilities 44, 46 illustrate another potential configuration for tracking utilities. Tracking utilities 44, 46 may be implemented as file system filter drivers or layered file systems, similar to the tracking utility 40. Both tracking utilities 44, 46 may track requests to the same volume 22. In some examples, the tracking utilities 44, 46 may track different logical data constructs on the volume 22. For example, one tracking utility 44 may track the volume 22 as a whole while the other tracking utility 46 may track a file or other data construct on the volume 22. Also, in some examples, the tracking utilities 44, 46 may track the same logical data construct, albeit with different starting and ending points, for example, as described herein below. Similar to the tracking utility 40, the tracking utilities 44, 46 may receive I/O requests and lock requests directed to the volume 22 and pass them to the next component. For example, tracking utility 44 may pass requests to the tracking utility 46. The tracking utility 46 may pass requests to the file system driver 48. Responses from the file system driver 48 may be similarly passed through the tracking utilities 44, 46 towards the operating system 12 (e.g., the I/O services component 31).

Tracking utilities 50 illustrate yet another configuration for tracking utilities. One or more tracking utilities 50 may be in communication with the operating system (e.g., the I/O services component 31) to receive I/O requests and lock requests directed towards the volume 23. The operating system 12 may be configured to send I/O requests and lock requests directed to the volume 23 to both the one or more tracking utilities 50 and to a file system driver 52 for the volume 23 in parallel.

Figure 2B:
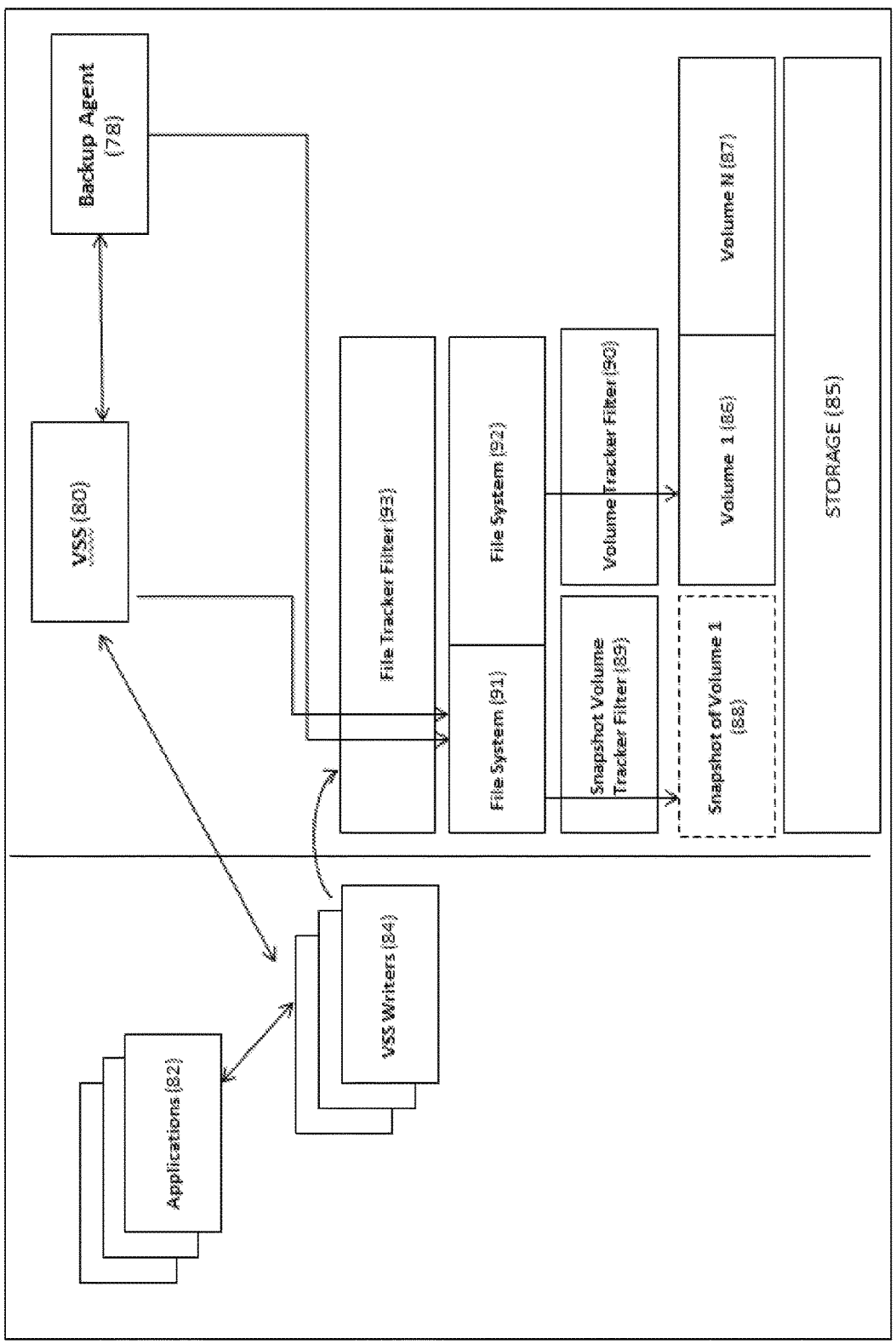
FIG. 2b is a logical block diagram showing another embodiment of an example architecture including additional optional features.

FIG. 2*b* is a logical block diagram showing another embodiment of an example architecture for synchronizing change tracking with snapshot creation. The backup agent 78 may be an application that creates backup copies of various volumes 86, 87. For example, the backup agent 78 may request snapshots and subsequently create backup copies of a volume 86, 87 or various other data constructs as described herein. Although the backup agent 78 is illustrated as an application separate from an operating system, it may be executed at any suitable position in the example architecture. For example, the backup agent 78 may be offered as a utility of an operating system. The architecture of FIG. 2*b* can also include a file tracker filter (driver) 93 to be used for a file level backup, and a volume tracker filter (driver) 90 to be used for a block or sector level backup.

A volume snapshot service 80 may be utilized to create snapshots of a volume 86, 87, or other data construct. Various applications 82 in the architecture may direct a snapshot request to the volume snapshot service 80. Although various examples herein refer to a snapshot of a volume, snapshots may also be requested for any other logical data construct on a volume such as a file, directory, database, etc. Volume snapshot service 80 may comprise one or more writers 84. When a snapshot request is received, the s Volume snapshot service 80 may deploy a writer to prepare the target volume for the snapshot. The architecture may also include one or more file systems 90, 91 and snapshot volume tracker filter 89, and storage 85. The components of the architecture may be used as described herein to create, for example, a snapshot 88 of volume 86.

Figure 3:
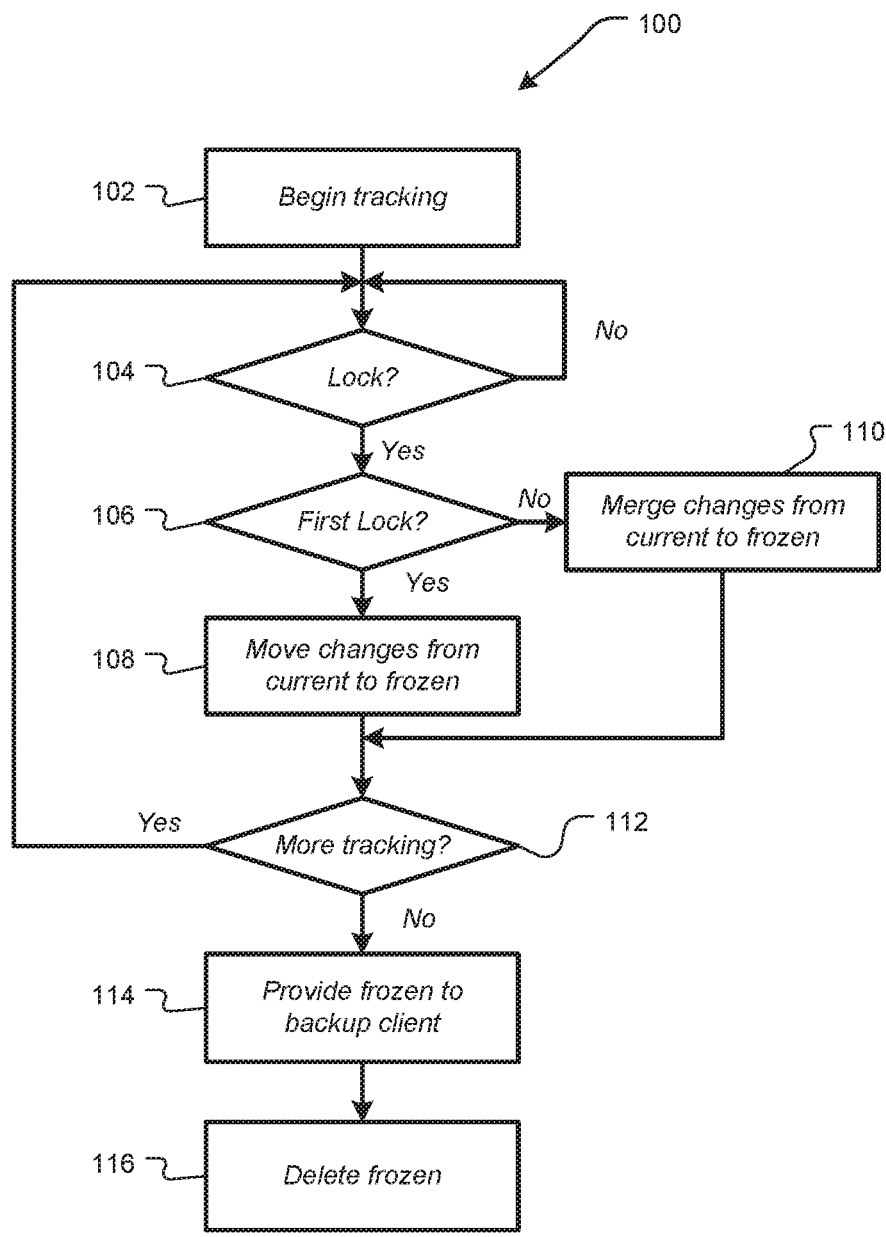
FIG. 3 is a flow chart showing one embodiment of a process flow that may be executed by a tracking utility to synchronize changes to a volume or other logical data construct with requested snapshots.

FIG. 3 is a flow chart showing one embodiment of a process flow 100 that may be executed by a tracking utility to synchronize changes to a volume or other logical data construct with requested snapshots. Although the description of the process flow 100 refers to synchronizing a volume, the actions described may also be applied to synchronize another logical data construct, such as a file, folder, database, etc. At 102, the tracking utility may begin tracking the volume. For example, the tracking utility may receive a start request from the backup client 70 instructing the utility to begin tracking as described herein. When the tracking utility begins tracking, it may begin storing indications of I/O requests to the volume to its current changes list. For example, the tracking utility may store the addresses of data blocks from the volume that are modified by the tracked I/O requests. In some examples, the tracking utility may establish a current changes list C and/or a frozen changes list F, for example, at one or more RAM locations 56, 58 associated with the tracking utility, at a data storage 18 or at any other suitable location. In some examples, the tracking utility may store to the current changes list only those I/O requests that would result in a change to at least one data block at the volume. For example, the tracking utility may store an address or other identifier of each data block that has been or is to be modified.

At 104, the tracking utility may determine whether a new lock request has been received. As described herein, a lock request may indicate that an application or other system component has requested a snapshot of the volume. If no lock request is detected, the tracking utility may continue to track changes to the volume and return to 104, as shown. If a lock request is detected at 106, the tracking utility may determine, at 106, whether the detected lock request is the first lock request directed to the volume since tracking began at 102. If the detected lock request is the first lock request, then the tracking utility may, at 108, move the changes stored at the current changes list to the frozen changes list and clear the current changes list. If the detected lock request is not the first lock request, then the tracking utility may merge the frozen changes and current changes lists at 110 without clearing the current changes list.

After either moving the current changes list to the frozen changes list at 108 or merging the two lists at 110, the tracking utility may determine at 112 whether it is to continue tracking the volume. In various examples, the tracking utility may continue tracking the volume until it receives a command to stop tracking from the backup client 70. If tracking is to continue, the tracking utility may return to 104 and proceed as described above. If tracking is to stop (e.g., if the tracking utility has received a request to stop tracking from the backup client 70), then the tracking utility may provide a copy of the frozen changes list to the backup client 70. At this point, the frozen changes list may comprise an indication of all data blocks at the volume that have been changed between the time that the instruction to begin tracking was received at 102 and the time of the most recent lock request (e.g., the most recent snapshot of the volume). In some examples, the tracking utility may also provide the backup client 70 with a copy of the current changes list. At this point, the current changes list may comprise an indication of all data blocks at the volume that have been changes between the time that the first lock request was received and the time that tracking was stopped. In some examples, at 116, the tracking utility may clear the frozen changes list and await an instruction to begin tracking again.

Figure 4:
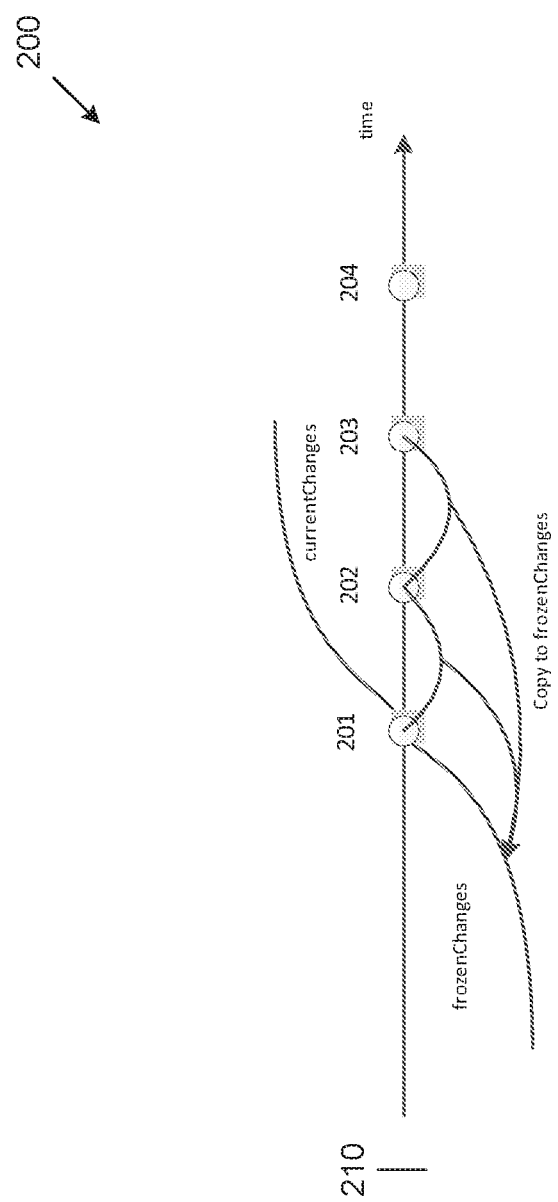
FIG. 4 is a timeline showing one embodiment of the operation of a tracking utility as described with respect to the process flow of FIG. 3.

FIG. 4 is a timeline 200 showing one embodiment of the operation of a tracking utility as described with respect to the process flow 100. At 210, tracking of the volume may begin. Point 201 indicates the first lock request received by the tracking utility at 104. In response, the tracking utility may copy the current changes (e.g., changes recorded since 210) to the frozen changes list while clearing the current changes list. Point 202 indicates a second lock request received by the tracking utility at 104. In response, the tracking utility may merge the current and frozen changes lists, as described with respect to 110. Point 203 indicates a third lock request received by the tracking utility at 104. Again, in response, the tracking utility may merge the current and frozen changes lists at 110. At point 204, the tracking utility may receive a request to stop tracking.

Figure 5:
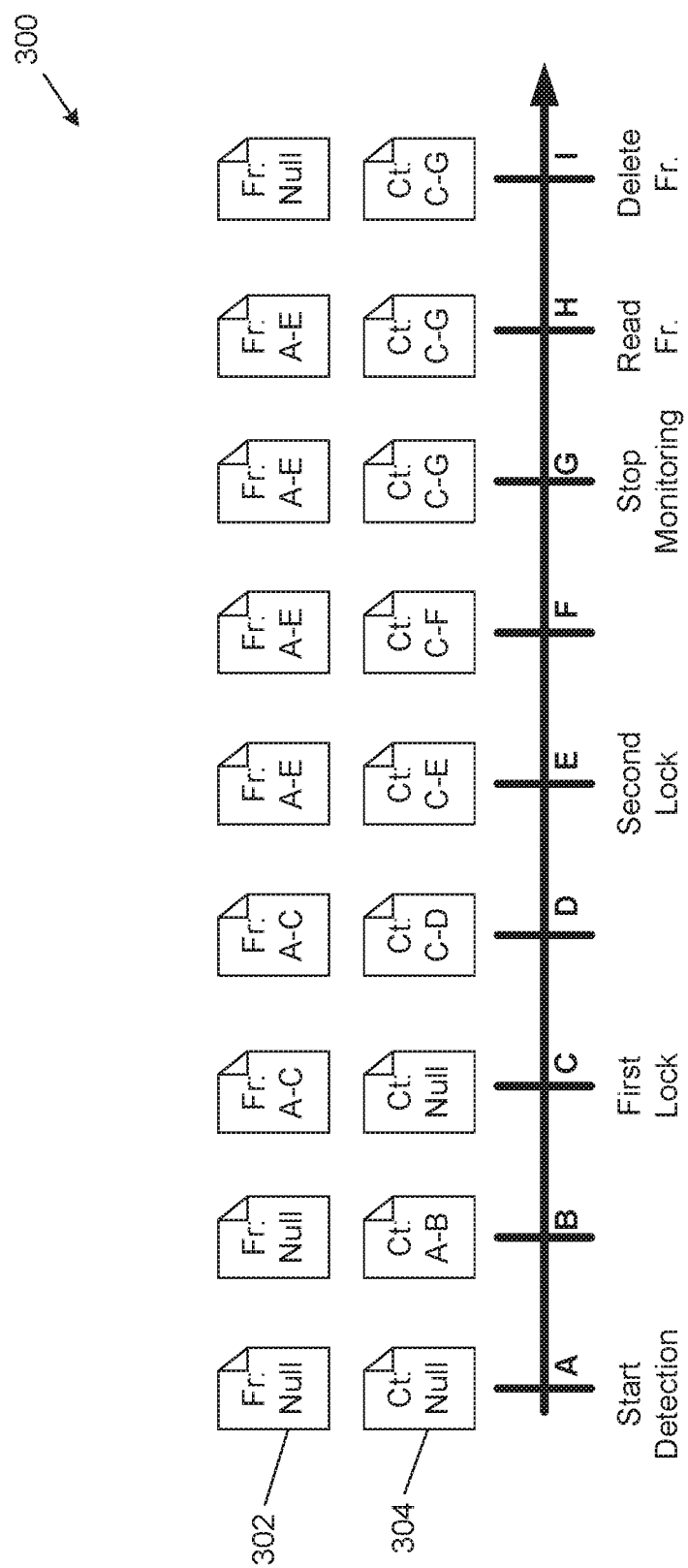
FIG. 5 is a timeline showing the state of the frozen changes list and current changes list during the execution of one embodiment of a tracking utility.

FIG. 5 is a timeline 300 showing the state of the frozen changes list 302 and current changes list 304 during the execution of one embodiment of a tracking utility according to the process flow 100. At point A, the tracking utility may begin tracking, similar to 102 above. For example, the tracking utility may receive a start request from the backup client 70. When the tracking utility begins tracking, both the frozen changes list 302 and the current changes list may be empty. As tracking progresses, however, changes may be written to the current changes list 304. For example, at point B, no lock request has yet been received. The frozen changes list is still empty. The current changes list, however, includes an indication of all changes to the volume from the beginning of tracking a point A to the present at point B. At point C, the tracking utility may receive its first lock request.

At this point, as described above with respect to 108, changes reflected in the current changes list 304 may be moved to the frozen changes 302 list while the current changes 304 list is emptied. As a result, at point C, the current changes list 304 may be empty while the frozen changes list 302 may comprise the previous contents of the current changes list 304 (e.g., all of the changes to the volume between A and C). As tracking continues, the current changes list may continue to be updated to include changes to the volume. At point D, a second lock request has not yet been received. The current changes list 304 may include all changes to the volume between C and D. The frozen changes list 302 may be the same as it was at C, that is, it may include all of the changes from the beginning of the tracking (point A) to the time of the first lock request (point C).

At point E, the tracking utility may receive a second lock request. As described, the content of the current changes list 304 may be merged with the frozen changes list. As a result, at point E, the current changes list 304 may include all changes from C to E. The frozen changes list 302 may include all changes from A to E. At point F, the current changes list 304 may reflect continued updates and may include all changes from C to F. The frozen changes list may still include changes between A and the receipt of the most recent lock request at E. At point G, the tracking utility may receive a request to stop tracking. At point H, the backup client 70 may receive the frozen changes list. At point I, the tracking utility may delete the frozen changes list 304 and await its next instruction.

Figure 6:
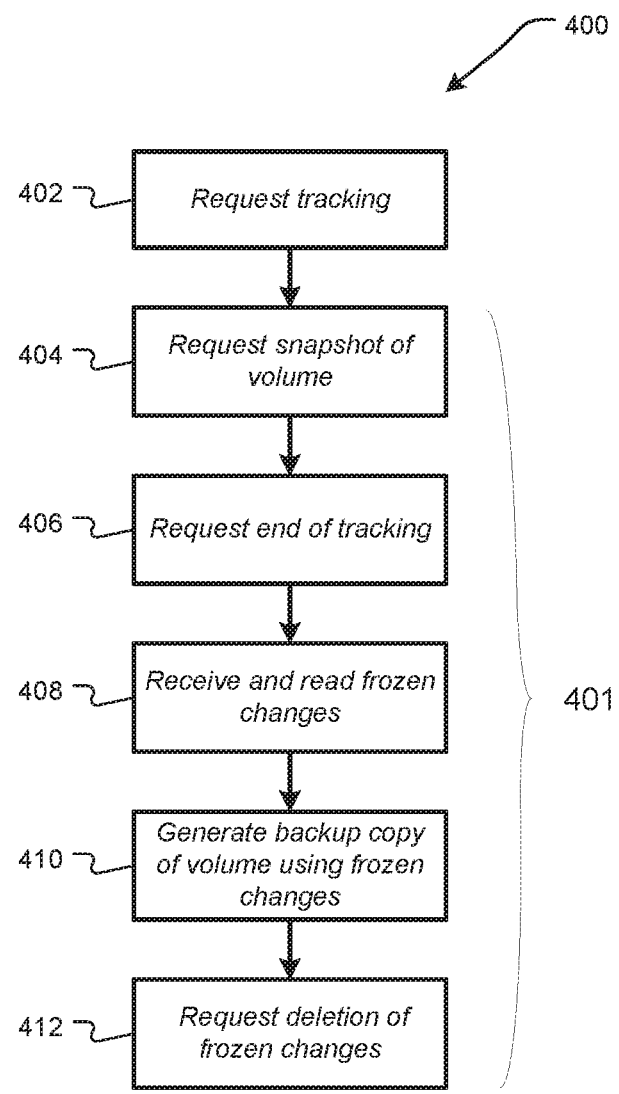
FIG. 6 is a flow chart showing one embodiment of a process flow that may be executed by the backup client or agent to create a backup copy of a volume or other data construct utilizing tracking utilities as described herein.

FIG. 6 is a flow chart showing one embodiment of a process flow 400 that may be executed by the backup client 70 to create a backup copy of a volume or other data construct utilizing tracking utilities as described herein. Although the description of the process flow 400 refers to synchronizing a volume, the actions described may also be applied to synchronize another logical data construct, such as a file, folder, database, etc. At 402, the backup client 70 may request tracking of a target volume. For example the backup client 70 may direct a start request to a tracking utility that may begin tracking the target volume, for example, as described herein with respect to FIGS. 3-5. The backup client 70 may request tracking at any suitable point in its processing. In some examples, the backup client 70 may request tracking shortly before it begins a backup operation. Also, in some embodiments, the backup client 70 may request tracking before or during completion of a previous backup operation, as described with respect to FIG. 7.

After tracking has been requested at 402, the backup client 70 may initiate a backup operation 401. For example, at 404, the backup client 70 may request a snapshot of the target volume. The request may be directed to the snapshot utility 72, as described herein above. The snapshot utility 72 (e.g., a writer 74) may begin the process of creating the snapshot including, for example, sending a lock request to the volume. At 406, the backup client 70 may request that the tracking utility stop tracking the target volume. The instruction to stop tracking at 406 may occur after the snapshot requested at 404 is completed and, therefore, after the lock request indicating the snapshot time is received by the target volume. The backup client 70 may determine that the snapshot is completed in any suitable manner. In some examples, the snapshot utility 72 may provide the backup client 70 with an indication that its requested snapshot is complete. Also, in some examples, the backup client 70 may wait a predetermined time after requesting the snapshot before requesting that tracking stop.

At 408, the backup client 70 may receive the frozen changes list from the tracking utility. As described above, the frozen changes list may indicate all data blocks at the target volume that were modified between the time that tracking was requested at 402 and the time of the most recent lock request (i.e., snapshot of the target volume). At 410, the backup client 70 may then create a differential or incremental backup copy of the target volume. For example, the backup client 70 may include in the backup copy only those data blocks from the snapshot that are also indicated by the frozen changes list. At 412, the backup client 70 may request deletion of the frozen changes as the backup copy of the volume has already been generated.

Figure 7:
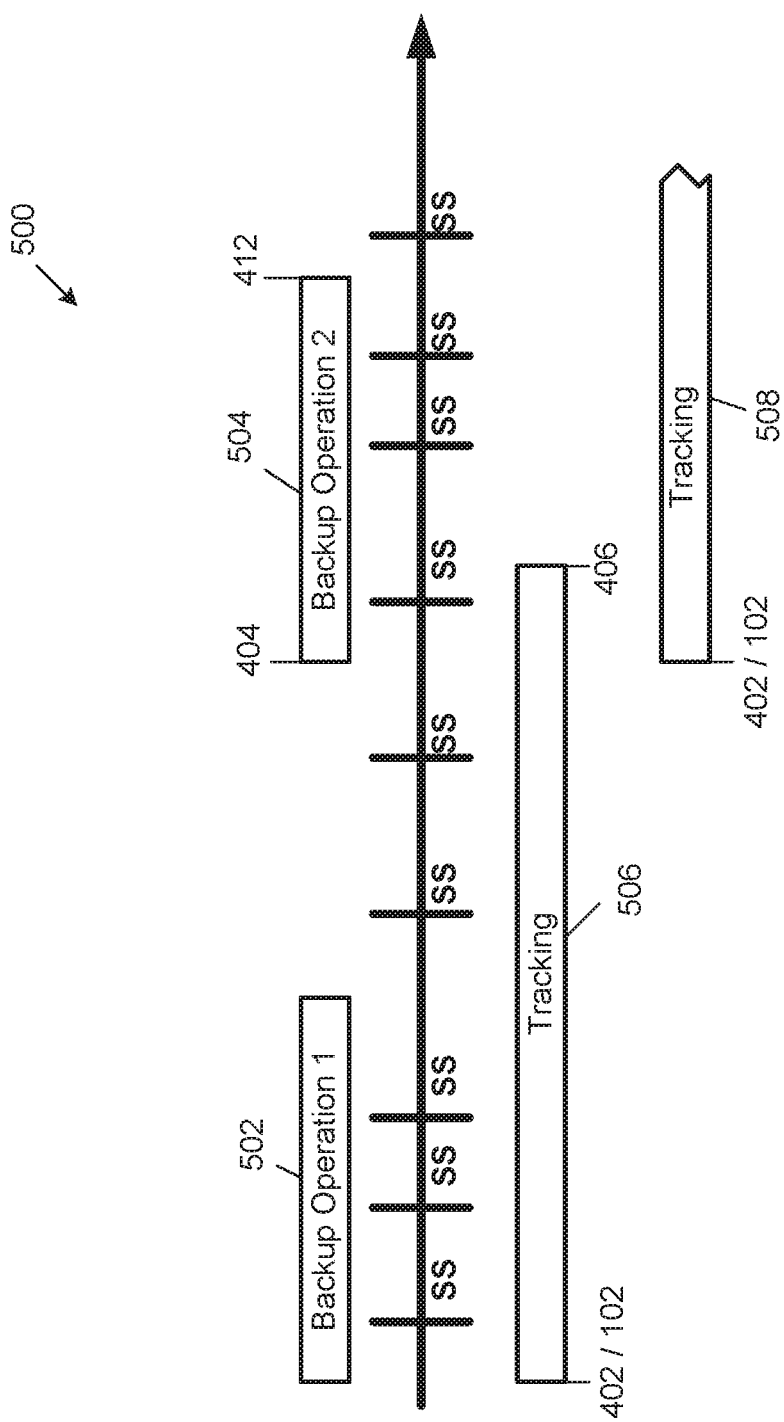
FIG. 7 is a timeline showing one embodiment of the execution of a backup client and tracking utilities over multiple backup operations.

FIG. 7 is a timeline showing one embodiment of the execution of a backup client 70 and tracking utilities over multiple backup operations. Ticks on the timeline labeled SS indicate snapshots of the target volume, evident to the tracking utility by lock requests. At 402/102 the backup client 70 may request and a first tracking utility 506 may begin tracking changes to the target volume, for example, as described with respect to the process flow 300 of FIG. 3 which shows the begin tracking step 102. At 404, the backup client may begin a backup operation 502. The backup operation 502 may begin to generate a reference backup copy of the target volume. Accordingly, the backup operation 502 may generate a backup copy of the target volume using all of the data blocks of the target volume. For example, the backup client 70 may request a snapshot of the target volume during the backup operation 502 and copy the complete snapshot to generate the reference backup copy. The tracking utility 506 may continue to execute as described in FIG. 3 while the backup operation 502 is completed.

Sometime after completing the backup operation 502, the backup client 70 may begin second backup operation 504. The backup operation 504 may be executed to generate an differential and/or incremental backup copy based on the reference backup copy created at 502 and may proceed as described above with respect to FIG. 6. For example, the backup client 70 may initiate a second tracking utility 508. After requesting a snapshot, the backup client 70 may request termination of the first tracking utility 506. The first tracking utility 506 may then provide its frozen changes list. The frozen changes list of the first tracking utility 506, then, may include an indication of all changes to the target volume between the beginning of the backup operation 502, when the tracking utility 506 was initiated, and the snapshot for the backup operation 504. In this way, the frozen changes list form the tracking utility 506 may include all changes to the volume since the prior backup operation 502.

It is possible that the frozen changes list from the tracking utility 506 will be over inclusive. For example, there may have been changes to the target volume between the time that the tracking utility 506 was initiated and the time that the snapshot for the backup operation 502 was processed. These changes will be reflected in the frozen changes list from the tracking utility 506. Also, for example, another architecture component may have requested one or more snapshot of the target volume after the snapshot from the backup operation 504 but before the tracking utility 506 was terminated. According, the frozen changes list from the tracking utility 506 may include changes made after the snapshot for the backup operation 504. This may, in turn, cause the backup client 70 to create a backup copy from the backup operation 504 that includes more data blocks from the target volume than is necessary. At the same time, however, the over inclusiveness may ensure that the backup copy generated by the backup operation 504 reflects all changes since the reference backup copy. Referring to the tracking utility 508, it may continue to track until it is terminated by the backup client 70, for example, during a subsequent backup operation (not shown).

Figure 8:
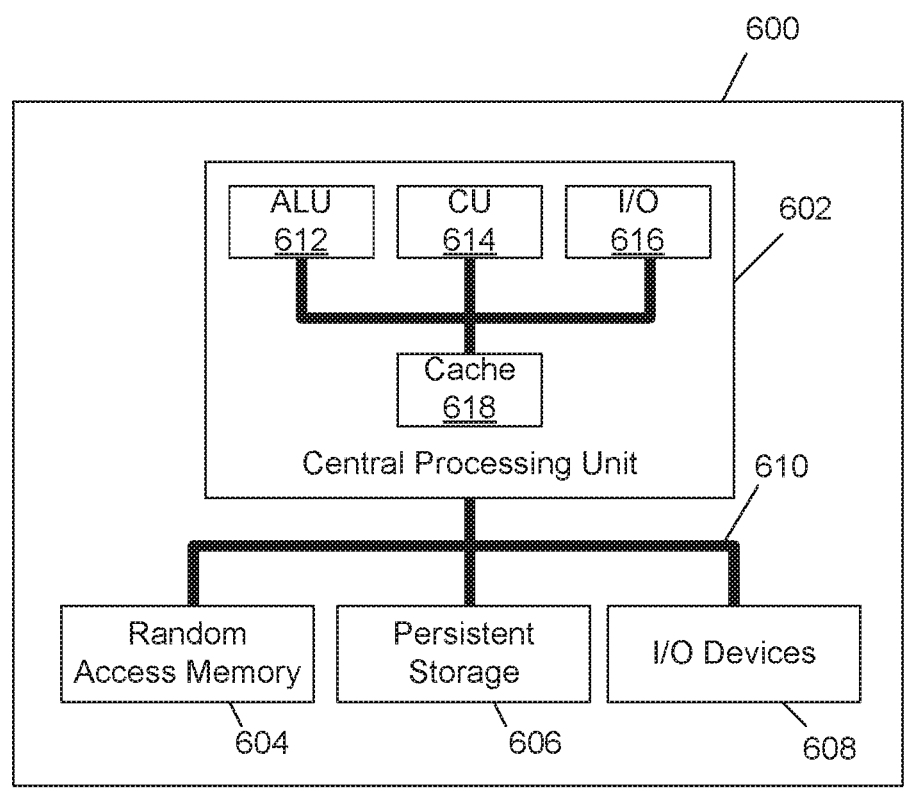
FIG. 8 is a block diagram showing one embodiment of an implementing computer system.

FIG. 8 is a block diagram showing one embodiment of an implementing computer system 600. For example, the computer system 600 is one example of a computer system that may implement the architecture 10 and/or execute the process flows 100, 400 described herein. The computer system 600 comprises a central processing unit (CPU) 602, a random access memory 606, and various input/output (I/O) devices 608. The various components 604, 606, 608 may be in communication with one another via one or more busses such as bus 610.

The CPU 602 may comprise an arithmetic and logic unit (ALU) 612, a control unit 614, cache memory 618, and an input and output I/O control 616. These components can be interconnected by a bus or busses 620, often comprising groups of wires or cables. The control unit 614, ALU 612 and basic I/O control (and sometimes other hardware closely linked with these sections) can be collectively considered the central processing unit (CPU) 602 for the computer system 600. The CPU 602 may be constructed on a single integrated circuit or microprocessor.

The control unit 614 (control system or central controller) may direct the various components of the computer system 600. For example, the control unit 614 may decode each instruction in a computer program and turn it into a series of control signals that operate other components of the computer system 600. To enhance performance or efficiency of operation, the control unit may, in some embodiments, alter the order of instructions. In some embodiments, the control unit 614 may comprise a program counter and a memory register that tracks the location in memory from which the next instruction is to be read.

The ALU 612 may be capable of performing arithmetic and logic operations. The set of arithmetic operations that a particular ALU 612 supports may be limited to adding and subtracting or might include multiplying or dividing, trigonometry functions (sine, cosine, etc.) and square roots. Some embodiments of the ALU 612 may be programmed to operate on whole numbers (integers), while others may use floating point representations of real numbers, for example. The ALU 612 may also compare numbers and return Boolean truth values (e.g., true or false).

Some embodiments of the system 600, such as those implementing superscalar computers, may contain multiple ALUs 612 to facilitate processing multiple instructions at the same time. For example, graphics processors and computers with Simple Instruction Multiple Data (SIMD) and/or Multiple Instruction Multiple Data (MIMD) features often possess ALU's 612 that can perform arithmetic operations on vectors and matrices. Some embodiments of the computer system 600 may include one or more RAM cache memories 618 configured to move more frequently needed data into the cache automatically.

Some embodiments described herein may comprise multiple CPU's 602. For example, functions may be divided between separate CPU's 602, creating a multiprocessing configuration. For example, multiprocessor and multi-core (multiple CPUs on a single integrated circuit) computer systems with co-processing capabilities may be employed. Also, multitasking may be employed as a computer processing technique to handle simultaneous execution of multiple computer programs.

Random access memory 604 may comprise any suitable type of memory including, for example, Dynamic Random Access Memory (DRAM), Double Data Rate Synchronous Dynamic Random Access Memory (DDR SDRAM). Persistent storage 606 may be similar to the storage device 18 described above with respect to the architecture 10. For example, persistent storage may comprise any type of persistent storage device including, for example, a single fixed disk drive, an array of disk drives, an array of disk drives combined to provide the appearance of a larger, single disk drive, a solid state drive (SSD), a storage area network (SAN), etc. I/O devices 608 may, for example, be managed by the I/O control 616 and may include, for example, keyboards, mice, screen displays, monitors, printers, hard disk drives, floppy disk drives, joysticks, and image scanners.

Changed Blocks Tracking Embodiments for Writable or Modifiable Snapshot Embodiments In one embodiment, the preceding snapshot related systems and methods are suitable for use with snapshots that are read-only or otherwise unmodified at the snapshot level. That is, the snapshot itself is not subsequently modified over time. Writable snapshots are used in various systems. As an example, such writable snapshots are used by developers in some of operating systems. This category of writable or modifiable snapshots avoids having to stop an operating system for too long time. Instead, by using a writable snapshot a given computer system or software or hardware subsystem thereof can be made available sooner during a backup of the given computer system or subsystem. In addition, there can be changed block tracking that involves a volume filter driver or a file system filter driver. The volume filter driver can be used to perform a backup of a block or sector, and the file system filter driver can be used for a file level backup.

In one embodiment, with regard to a tracker utility such as a Changed Blocks Tracker the utility may be configured to track the changes external to snapshots. Thus, if a snapshot is writable, any changes inside the snapshots are 'invisible' to such a tracking utility. As a result, data consistency will be lost, and the backup archive is corrupted as a result of the nature of the writable snapshot and the use of an ill-suited tracking utility for such a scenario. For modifiable or writable snapshots one or more different tracking and back up approaches can be used.

Figure 9:
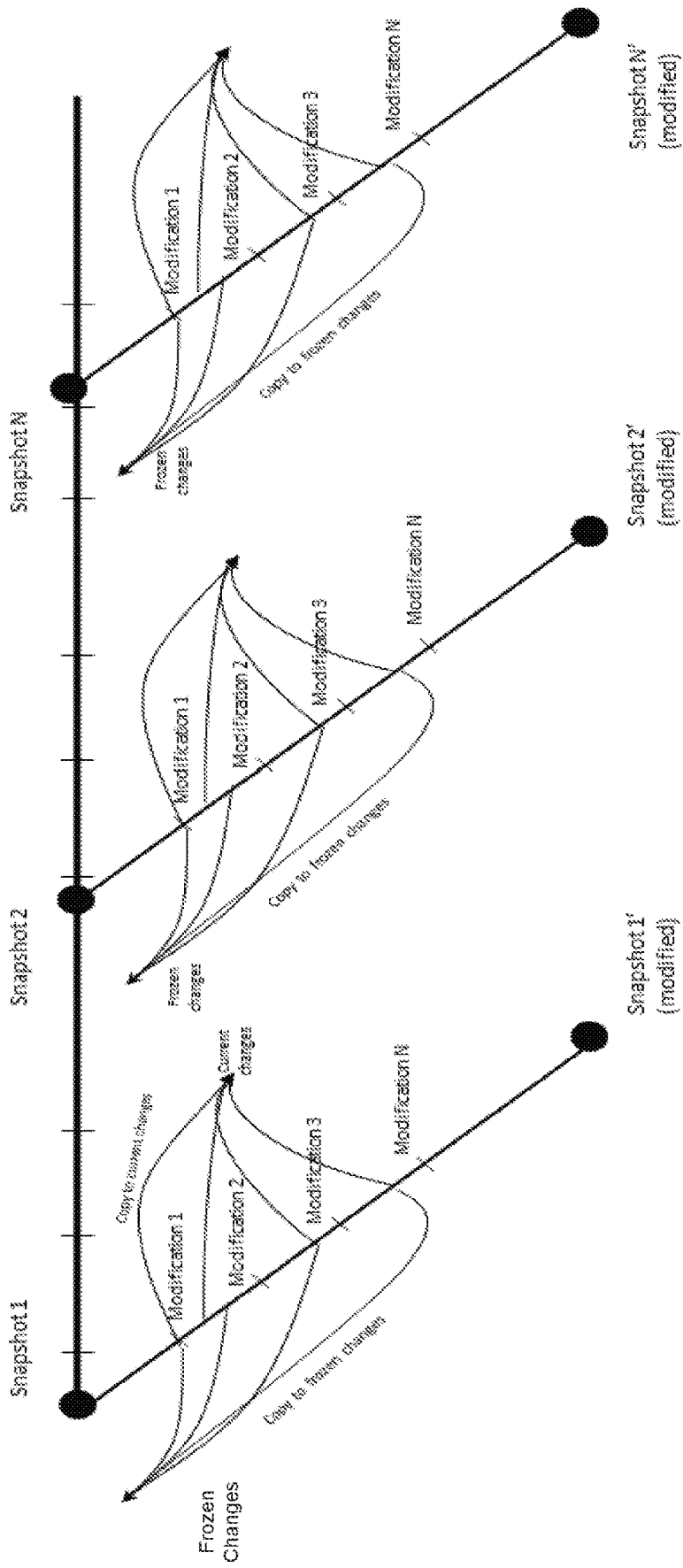
FIGS. 9 and 10 are diagrams showing example nonlimiting embodiments of writable or modifiable snapshots 1 to N being initiated and finalized as a result of one or more modifications to each such snapshot.

As part of a given Operating System or Application, several snapshots such as up to N snapshots designated for example as Snapshot 1, Snapshot 2, . . . Snapshot N are generated. All the snapshots shown in FIG. 9 are writable, so after each snapshot's creation, it can be subsequently modified. To have a consistent backup using writable snapshots, the tracking utility tracks both the modifications that occur between the creation and modification of such snapshots and the internal modifications of each such snapshots. These different sets of modifications can be referred to as external modifications and internal modifications to writable snapshots. All of these modifications can be tracked using the Tracking Utility. In turn, such internal and external modifications can then be applied to a backup archive.

FIG. 9 shows a horizontal axis corresponding to time along which snapshot 1, snapshot 2 and snapshot N are arranged from left to right. Each snapshot shown is modifiable or otherwise described as writable. That is, with respect to the snapshots 1, 2, to N each individual snapshot undergoes one or more modifications that need to be tracked to facilitate a future restore. Various snapshot level modifications such as modifications 1, 2 . . . N are shown for each snapshot 1 . . . N.

As shown in FIG. 9, a series of modifications one through N can be made such that the initial snapshot 1 can change as a result of the modifications to become a modified snapshot 1'. With respect to FIG. 9, the modified snapshots include snapshot 1', snapshot 2' and snapshot N' and are noted with the prime designation ('). These snapshots are the result of internal snapshot modifications being applied to each such snapshot. The per snapshot modifications occur sequentially overtime and can be combined or otherwise committed to generate final modified shown by the bottom three nodes of FIG. 9.

An exemplary method of tracking one or more sets of data relating to internal and external snapshot modifications to support a backup software or archiving process can be implemented with various software commands, delays, event tracking and other features including without limitation:

Get Tracking command such as block tracking command or writable snapshot tracking command
  Wait for creation of one or more snapshots (writable or read only)
  As example in FIG. 9, Snapshot 1 is created
  Tracking Utility starts tracking any records (writings) to the Snapshot 1
  Is Snapshot 1 modified?
  If No—use one or more schemes discussed above relative to FIGS. 1-8
  If Yes, continue to one or more steps below
  Include record of Snapshot 1 modification's to Frozen Changes and Current Changes
  Snapshot 1 is completed. The resulting or finalized snapshot is Snapshot 1'
  As shown in FIG. 9, Snapshot 2 is created (in our example it is writable as well)
  Tracking Utility starts tracking all the modifications in Snapshot 2
  Include record of Snapshot 2 modification's to Frozen Changes and Current Changes
  Snapshot 2 is completed to a resulting or finalized Snapshot 2'
  Snapshot N is created (in our example it is writable as well)
  Tracking Utility starts tracking all the modifications in Snapshot N
  Put all the modifications to Frozen Changes and Current Changes
  Snapshot N is completed to a resulting Snapshot N'

After that, backup/restore software receives request from an application requiring a name of required snapshot. For example, Snapshot 2

All the Current Changes and Frozen changes for Snapshot 2 are applied to a backup archive. These changes occur changes that resulted in creation of Snapshot 2' and other related changes that were backed up that were external to Snapshot 2 modifications Remaining unnecessary records for Snapshot 1 and Snapshot N are deleted.

Collection-Based Approach to Data Tracking and Backup of Writable Snapshots

Figure 10:
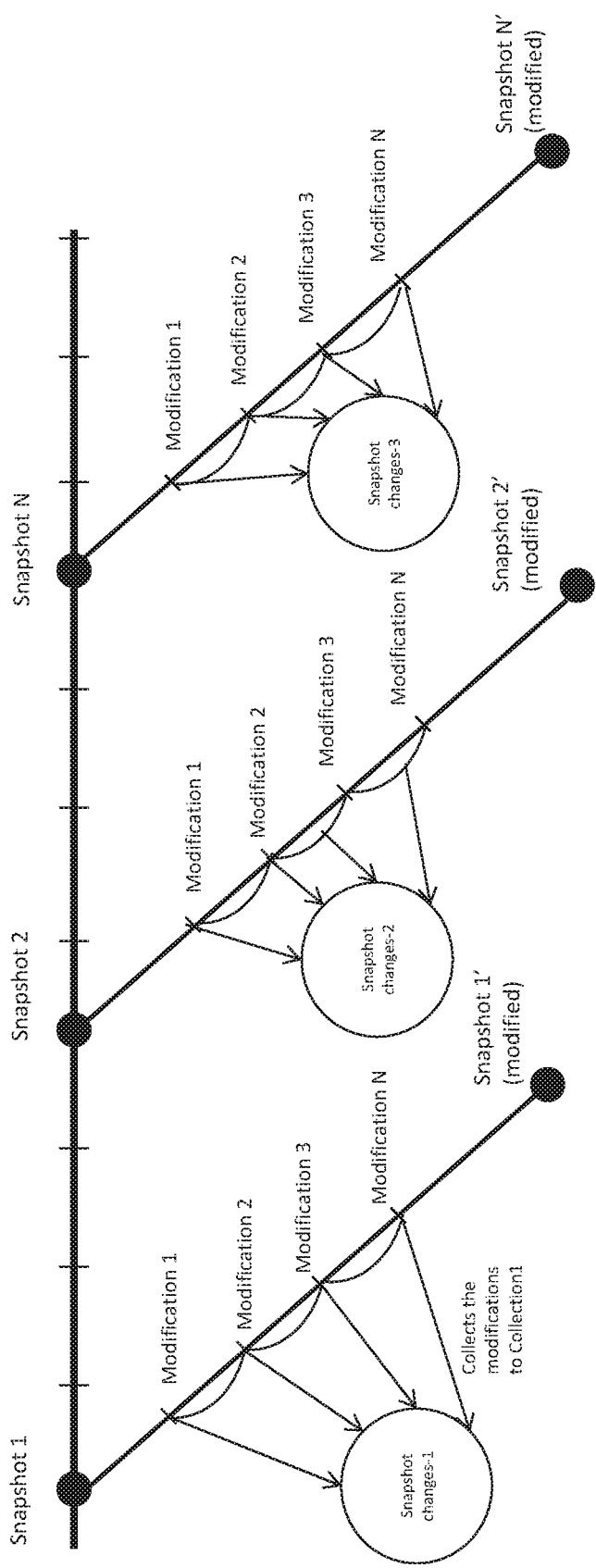

In contrast with the backup software operations shown in FIG. 9, an alternative implementation to writing Current Changes and Frozen Changes as noted in the bulleted steps above can be implemented as shown in FIG. 10. A data repository or collection-based approach can be used. Specifically, in one embodiment, the backup software tracks any changes or modification's to a snapshot and routes them to a special Collection, e.g. Snapshot Changes for storage for later retrieval and play back as part of a restore process.

FIG. 10 shows a series of collections which can be implemented using data sets suitable for a given data repository and use by a data restore process. The backup software generates a collection of changes for each snapshot: Snapshot 1, Snapshot 2, Snapshot N. In turn, when the backup software requests the required name of snapshot which is needed for a backup, the backup software can be configured to delete the other collections of Snapshot Changes except for the collection for the snapshot required (e.g. Snapshot 2). As result, the backup/restore software generates a consistent backup archive using information from Snapshot 2, Snapshot Changes and Snapshot 2'.

Figure 11:
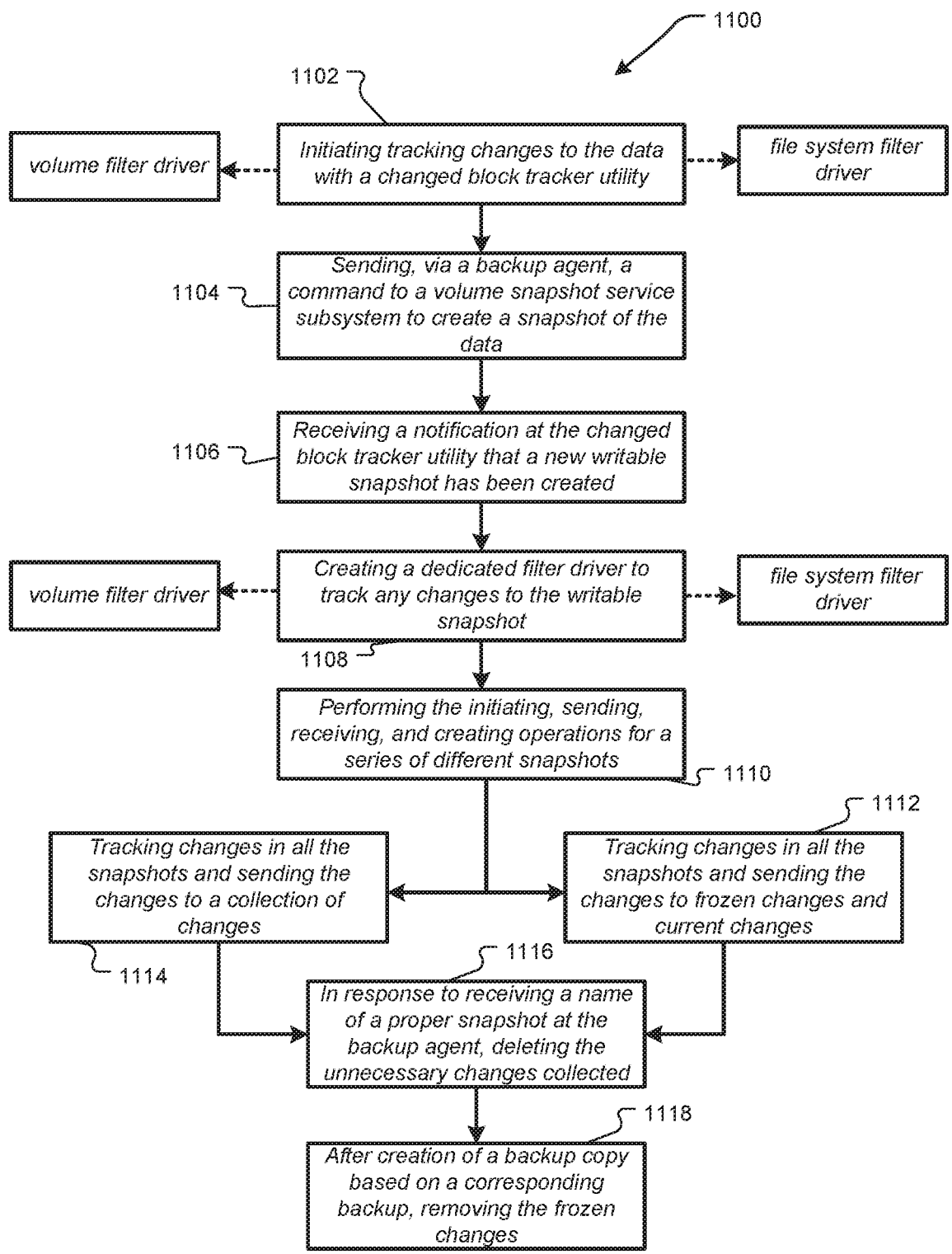
FIG. 11 is a flow chart showing another embodiment of a process flow that may be executed by the backup client or agent to create a backup copy of a volume or other data construct utilizing tracking utilities as described herein.

FIG. 11 is a flow chart showing an embodiment of a process flow 1100 that may be executed by the backup client 70 or backup agent 72 to create a backup copy of a volume or other data construct utilizing tracking utilities as described herein. At 1102, the process may initiate tracking changes to the data with a changed block tracker utility. In an embodiment, the tracker may be a volume filter driver for performing a block or sector backup. Also, in an embodiment, the tracker may be a file system filter driver for performing a file-level backup. At 1104, the process may send, via a backup agent (e.g., backup agent 78), a command to a volume snapshot service subsystem to create a snapshot of the data. Further, at 1106, the process may receive a notification at the changed block tracker utility that a new writable snapshot has been created. Additionally, at 1108, the process may create a dedicated filter driver to track any changes to the writable snapshot. The dedicated filter driver may be a volume filter driver or a file system filter driver.

Moreover, at 1110, the process may perform the initiating, sending, receiving, and creating operations described above for a series of different snapshots. Further, at 1112, the process may track changes in all the snapshots and send the changes to frozen changes and current changes. Additionally or alternatively, at 1114, the process may track changes in all the snapshots and send the changes to a collection of changes. At 1116, the process may, in response to receiving a name of a proper snapshot at the backup agent, delete the unnecessary changes collected. At 1118, after creation of a backup copy based on a corresponding backup, the process may remove the frozen changes.

A number of implementations have been described. Nevertheless, it will be understood that various modifications may be made without departing from the spirit and scope of the disclosure. For example, various forms of the flows shown above may be used, with steps re-ordered, added, or removed. Accordingly, other implementations are within the scope of the following claims.

In various embodiments, modules or software can be used to practice certain aspects of the invention. For example, software-as-a-service (SaaS) models or application service provider (ASP) models may be employed as software application delivery models to communicate software applications to clients or other users. Such software applications can be downloaded through an Internet connection, for example, and operated either independently (e.g., downloaded to a laptop or desktop computer system) or through a third-party service provider (e.g., accessed through a third-party web site). In addition, cloud computing techniques may be employed in connection with various embodiments of the invention. In certain embodiments, a "module" may include software, firmware, hardware, or any reasonable combination thereof.

Various embodiments of the systems and methods may include and/or utilize a computer device. In various embodiments, a computer may be in communication with a server or server system utilizing any suitable type of communication including, for example, wired or wireless digital communications. In some embodiments, the server or server system may be implemented as a cloud computing application and/or in a similar manner and may provide various functionality of the systems and methods as SaaS.

The examples presented herein are intended to illustrate potential and specific implementations of the present invention. The examples are intended primarily for purposes of illustration of the invention for those skilled in the art. No particular aspect or aspects of the examples are necessarily intended to limit the scope of the present invention The figures and descriptions of the present invention have been simplified to illustrate elements that are relevant for a clear understanding of the present invention, while eliminating, for purposes of clarity, other elements. Those of ordinary skill in the art may recognize, however, that these sorts of focused discussions would not facilitate a better understanding of the present invention, and therefore, a more detailed description of such elements is not provided herein.

The processes associated with the present embodiments may be executed by programmable equipment, such as computers. Software or other sets of instructions that may be employed to cause programmable equipment to execute the processes may be stored in any storage device, such as, for example, a computer system (non-volatile) memory, an optical disk, magnetic tape, or magnetic disk. Furthermore, some of the processes may be programmed when the computer system is manufactured or via a computer-readable memory medium.

It can also be appreciated that certain process aspects described herein may be performed using instructions stored on a computer-readable memory medium or media that direct a computer or computer system to perform process steps. A computer-readable medium may include, for example, memory devices such as diskettes, compact discs of both read-only and read/write varieties, optical disk drives, and hard disk drives. A computer-readable medium may also include memory storage that may be physical, virtual, permanent, temporary, semi-permanent and/or semi-temporary.

A "computer," "computer system," "component," "computer device," or "processor" may be, for example and without limitation, a processor, microcomputer, minicomputer, server, mainframe, laptop, personal data assistant (PDA), wireless e-mail device, cellular phone, pager, processor, fax machine, scanner, or any other programmable device configured to transmit and/or receive data over a network. Computer systems and computer-based devices disclosed herein may include memory for storing certain software applications used in obtaining, processing, and communicating information. It can be appreciated that such memory may be internal or external with respect to operation of the disclosed embodiments. The memory may also include any means for storing software, including a hard disk, an optical disk, floppy disk, ROM (read only memory), RAM (random access memory), PROM (programmable ROM), EEPROM (electrically erasable PROM) and/or other computer-readable memory media. In various embodiments, a "host," "engine," "loader," "filter," "agent," "platform," or "component" may include various computers or computer systems, or may include a reasonable combination of software, firmware, and/or hardware.

In various embodiments of the present invention, a single component may be replaced by multiple components, and multiple components may be replaced by a single component, to perform a given function or functions. Except where such substitution would not be operative to practice embodiments of the present invention, such substitution is within the scope of the present invention. Any of the computer systems described herein, for example, may be replaced by a "server farm" or other grouping of networked servers (e.g., a group of server blades) that are located and configured for cooperative functions. It can be appreciated that a server farm may serve to distribute workload between/among individual components of the farm and may expedite computing processes by harnessing the collective and cooperative power of multiple servers. Such server farms may employ load-balancing software that accomplishes tasks such as, for example, tracking demand for processing power from different machines, prioritizing and scheduling tasks based on network demand, and/or providing backup contingency in the event of component failure or reduction in operability.

In general, it may be apparent to one of ordinary skill in the art that various embodiments described herein, or components or parts thereof, may be implemented in many different embodiments of software, firmware, and/or hardware, or modules thereof. The software code or specialized control hardware used to implement some of the present embodiments is not limiting of the present invention. For example, the embodiments described hereinabove may be implemented in computer software using any suitable computer programming language such as .NET, SQL, MySQL, or HTML using, for example, conventional or object-oriented techniques. Programming languages for computer software and other computer-implemented instructions may be translated into machine language by a compiler or an assembler before execution and/or may be translated directly at run time by an interpreter.

Examples of assembly languages include ARM, MIPS, and x86; examples of high level languages include Ada, BASIC, C, C++, C #, COBOL, Fortran, Java, Lisp, Pascal, Object Pascal; and examples of scripting languages include Bourne script, JavaScript, Python, Ruby, PHP, and Perl. Various embodiments may be employed in a Lotus Notes environment, for example. Such software may be stored on any type of suitable computer-readable medium or media such as, for example, a magnetic or optical storage medium. Thus, the operation and behavior of the embodiments are described without specific reference to the actual software code or specialized hardware components. The absence of such specific references is feasible because it is clearly understood that artisans of ordinary skill would be able to design software and control hardware to implement the embodiments of the present invention based on the description herein with only a reasonable effort and without undue experimentation.

Various embodiments of the systems and methods described herein may employ one or more electronic computer networks to promote communication among different components, transfer data, or to share resources and information. Such computer networks can be classified according to the hardware and software technology that is used to interconnect the devices in the network, such as optical fiber, Ethernet, wireless LAN, HomePNA, power line communication or G.hn. The computer networks may also be embodied as one or more of the following types of networks: local area network (LAN); metropolitan area network (MAN); wide area network (WAN); virtual private network (VPN); storage area network (SAN); or global area network (GAN), among other network varieties.

For example, a WAN computer network may cover a broad area by linking communications across metropolitan, regional, or national boundaries. As the systems and methods described herein aim to minimize I/O transactions, they may be useful in situations, such as cloud computing configurations, where I/O transactions are performed over a WAN or other network with long I/O delays. The network may use routers and/or public communication links. One type of data communication network may cover a relatively broad geographic area (e.g., city-to-city or country-to-country) which uses transmission facilities provided by common carriers, such as telephone service providers.

In another example, a GAN computer network may support mobile communications across multiple wireless LANs or satellite networks. In another example, a VPN computer network may include links between nodes carried by open connections or virtual circuits in another network (e.g., the Internet) instead of by physical wires. The link-layer protocols of the VPN can be tunneled through the other network. One VPN application can promote secure communications through the Internet. The VPN can also be used to separately and securely conduct the traffic of different user communities over an underlying network. The VPN may provide users with the virtual experience of accessing the network through an IP address location other than the actual IP address which connects the access device to the network.

The computer network may be characterized based on functional relationships among the elements or components of the network, such as active networking, client-server, or peer-to-peer functional architecture. The computer network may be classified according to network topology, such as bus network, star network, ring network, mesh network, star-bus network, or hierarchical topology network, for example. The computer network may also be classified based on the method employed for data communication, such as digital and analog networks.

Embodiments of the methods, systems, and tools described herein may employ internetworking for connecting two or more distinct electronic computer networks or network segments through a common routing technology. The type of internetwork employed may depend on administration and/or participation in the internetwork. Non-limiting examples of internetworks include intranet, extranet, and Internet. Intranets and extranets may or may not have connections to the Internet. If connected to the Internet, the intranet or extranet may be protected with appropriate authentication technology or other security measures. As applied herein, an intranet can be a group of networks which employ Internet Protocol, web browsers and/or file transfer applications, under common control by an administrative entity. Such an administrative entity could restrict access to the intranet to only authorized users, for example, or another internal network of an organization or commercial entity. As applied herein, an extranet may include a network or inter-network generally limited to a primary organization or entity, but which also has limited connections to the networks of one or more other trusted organizations or entities (e.g., customers of an entity may be given access an intranet of the entity thereby creating an extranet).

Computer networks may include hardware elements to interconnect network nodes, such as network interface cards (NICs) or Ethernet cards, repeaters, bridges, hubs, switches, routers, and other like components. Such elements may be physically wired for communication and/or data connections may be provided with microwave links (e.g., IEEE 802.12) or fiber optics, for example. A network card, network adapter or NIC can be designed to allow computers to communicate over the computer network by providing physical access to a network and an addressing system through the use of MAC addresses, for example. A repeater can be embodied as an electronic device that receives and retransmits a communicated signal at a boosted power level to allow the signal to cover a telecommunication distance with reduced degradation. A network bridge can be configured to connect multiple network segments at the data link layer of a computer network while learning which addresses can be reached through which specific ports of the network. In the network, the bridge may associate a port with an address and then send traffic for that address only to that port. In various embodiments, local bridges may be employed to directly connect local area networks (LANs); remote bridges can be used to create a wide area network (WAN) link between LANs; and/or, wireless bridges can be used to connect LANs and/or to connect remote stations to LANs.

In various embodiments, a hub may be employed which contains multiple ports. For example, when a data packet arrives at one port of a hub, the packet can be copied unmodified to all ports of the hub for transmission. A network switch or other devices that forward and filter OSI layer 2 datagrams between ports based on MAC addresses in data packets can also be used. A switch can possess multiple ports, such that most of the network is connected directly to the switch, or another switch that is in turn connected to a switch. The term "switch" can also include routers and bridges, as well as other devices that distribute data traffic by application content (e.g., a Web URL identifier or other data location information as described herein). Switches may operate at one or more OSI model layers, including physical, data link, network, or transport (i.e., end-to-end). A device that operates simultaneously at more than one of these layers can be considered a multilayer switch. In certain embodiments, routers or other like networking devices may be used to forward data packets between networks using headers and forwarding tables to determine an optimum path through which to transmit the packets.

As employed herein, an application server may be a server that hosts an API to expose business logic and business processes for use by other applications. Examples of application servers include J2EE or Java EE 5 application servers including Web Sphere Application Server. Other examples include Web Sphere Application Server Community Edition (IBM), Sybase Enterprise Application Server (Sybase Inc), WebLogic Server (BEA), JBoss (Red Hat), JRun (Adobe Systems), Apache Geronimo (Apache Software Foundation), Oracle OC4J (Oracle Corporation), Sun Java System Application Server (Sun Microsystems), and SAP Netweaver AS (ABAP/Java).

Also, application servers may be provided in accordance with the .NET framework, including the Windows Communication Foundation, .NET Remoting, ADO.NET, and ASP-.NET among several other components. For example, a Java Server Page (JSP) is a servlet that executes in a web container which is functionally equivalent to CGI scripts. JSPs can be used to create HTML pages by embedding references to the server logic within the page. The application servers may mainly serve web-based applications, while other servers can perform as session initiation protocol servers, for instance, or work with telephony networks. Specifications for enterprise application integration and service-oriented architecture can be designed to connect many different computer network elements. Such specifications include Business Application Programming Interface, Web Services Interoperability, and Java EE Connector Architecture.

In various embodiments, the computer systems, data storage media, or modules described herein may be configured and/or programmed to include one or more of the above-described electronic, computer-based elements and components, or computer architecture. In addition, these elements and components may be particularly configured to execute the various rules, algorithms, programs, processes, and method steps described herein.

Implementations of the present disclosure and all of the functional operations provided herein can be realized in digital electronic circuitry, or in computer software, firmware, or hardware, including the structures disclosed in this specification and their structural equivalents, or in combinations of one or more of them. Implementations of the disclosure can be realized as one or more computer program products, i.e., one or more modules of computer program instructions encoded on a computer readable medium for execution by, or to control the operation of, a data processing apparatus. The computer readable medium can be a machine-readable storage device, a machine readable storage substrate, a memory device, or a combination of one or more of them. The term "data processing apparatus" encompasses all apparatus, devices, and machines for processing data, including by way of example a programmable processor, a computer, or multiple processors or computers. The apparatus can include, in addition to hardware, code that creates an execution environment for the computer program in question, e.g., code that constitutes processor firmware, a protocol stack, a database management system, an operating system, or a combination of one or more of them.

A computer program (also known as a program, software, software application, script, or code) can be written in any form of programming language, including compiled or interpreted languages, and it can be deployed in any form, including as a stand alone program or as a module, component, subroutine, or other unit suitable for use in a computing environment. A computer program does not necessarily correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub programs, or portions of code). A computer program can be deployed to be executed on one computer or on multiple computers that are located at one site or distributed across multiple sites and interconnected by a communication network.

The processes and logic flows described in this disclosure can be performed by one or more programmable processors executing one or more computer programs to perform functions by operating on input data and generating output. The processes and logic flows can also be performed by, and apparatus can also be implemented as, special purpose logic circuitry, e.g., an FPGA (field programmable gate array) or an ASIC (application specific integrated circuit).

Processors suitable for the execution of a computer program include, by way of example, both general and special purpose microprocessors, and any one or more processors of any kind of digital computer. Generally, a processor will receive instructions and data from a read only memory or a random access memory or both. The essential elements of a computer are a processor for performing instructions and one or more memory devices for storing instructions and data. Generally, a computer will also include, or be operatively coupled to receive data from or transfer data to, or both, one or more mass storage devices for storing data, e.g., magnetic, magneto optical disks, or optical disks. However, a computer need not have such devices. Moreover, a computer can be embedded in another device, e.g., a mobile telephone, a personal digital assistant (PDA), a mobile audio player, a Global Positioning System (GPS) receiver, to name just a few. Computer readable media suitable for storing computer program instructions or computer program products and data include all forms of non volatile memory, media and memory devices, including by way of example semiconductor memory devices, e.g., EPROM, EEPROM, and flash memory devices; magnetic disks, e.g., internal hard disks or removable disks; magneto optical disks; and CD ROM and DVD-ROM disks. These may also be referred to as computer readable storage media. The processor and the memory can be supplemented by, or incorporated in, special purpose logic circuitry.

To provide for interaction with a user, implementations of described herein can be implemented on a computer having a display device, e.g., a CRT (cathode ray tube) or LCD (liquid crystal display) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input.

Implementations of the present disclosure can be realized in a computing system that includes a back end component, e.g., as a data server, or that includes a middleware component, e.g., an application server, or that includes a front end component, e.g., a client computer having a graphical user interface or a Web browser through which a user can interact with an implementation of the present disclosure, or any combination of one or more such back end, middleware, or front end components. The components of the system can be interconnected by any form or medium of digital data communication, e.g., a communication network. Examples of communication networks include a local area network ("LAN") and a wide area network ("WAN"), e.g., the Internet.

The computing system can include clients and servers. A client and server are generally remote from each other and typically interact through a communication network. The relationship of client and server arises by virtue of computer programs running on the respective computers and having a client-server relationship to each other.

While this disclosure contains many specifics, these should not be construed as limitations on the scope of the disclosure or of what may be claimed, but rather as descriptions of features specific to particular implementations of the disclosure. Certain features that are described in this disclosure in the context of separate implementations can also be provided in combination in a single implementation. Conversely, various features that are described in the context of a single implementation can also be provided in multiple implementations separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the implementations described above should not be understood as requiring such separation in all implementations, and it should be understood that the described program components and systems can generally be integrated together in a single software product or packaged into multiple software products.

While various embodiments have been described herein, it should be apparent, however, that various modifications, alterations and adaptations to those embodiments may occur to persons skilled in the art with the attainment of some or all of the advantages of the invention. The disclosed embodiments are therefore intended to include all such modifications, alterations and adaptations without departing from the scope and spirit of the invention. Accordingly, other embodiments and implementations are within the scope of the following claims. For example, the actions recited in the claims can be performed in a different order and still achieve desirable results.

What is claimed is:

1. A computer-implemented system for backing up data, the system comprising:
   at least one processor and an operatively associated storage device, wherein the at least one processor is programmed to:
   execute a tracking application;
   execute a file system driver; and
   execute a volume filter driver, wherein the volume filter driver is programmed to:
     receive a start tracking request;
     receive a plurality of write input/output (I/O) requests from the tracking application;
     record a change to an address of a block to be modified by one or more write I/O requests of the plurality of write I/O requests;
     forward the one or more write I/O requests to the file system driver;
     track modifications to a first writable snapshot, wherein the volume filter driver is programmed for performing a block or sector backup; and
     send tracked modifications to frozen changes and current changes.

2. The system of claim 1, wherein the frozen changes are used to generate a backup copy.

3. The system of claim 2, wherein the frozen changes are deleted once the backup copy is generated.

4. The system of claim 1, wherein the modifications are tracked to a plurality of writable snapshots.

5. The system of claim 4, wherein the volume filter driver is programmed to track changes to the plurality of writable snapshots and copy the changes to the plurality of writable snapshots to the frozen changes.

6. A method for backing up data, the method comprising:
initiating tracking changes to the data with a changed block tracker utility;
receive a plurality of write input/output (I/O) requests from the tracker utility;
sending, via a backup agent, a command to a volume snapshot service subsystem to create a snapshot of the data;
receiving a notification at the changed block tracker utility that a new writable snapshot has been created;
tracking changes in all snapshots and sending the tracked changes to frozen changes and current changes;
creating a dedicated filter driver to track any changes to the writable snapshot; and
finalizing the writable snapshot.

7. The method of claim 6, further comprising:
performing the initiating, sending, receiving, and creating operations for a series of different snapshots.

8. The method of claim 6, further comprising:
in response to receiving a name of a proper snapshot at the backup agent, deleting unnecessary changes collected.

9. The method of claim 8, further comprising:
after creation of a backup copy based on a corresponding backup, removing the frozen changes.

10. The method of claim 6, wherein the changed block tracker utility is a volume filter driver for performing a block or sector backup.

11. The method of claim 6, wherein the changed block tracker utility is a file system filter driver for performing a file-level backup.

12. The method of claim 6, wherein the dedicated filter driver to track any changes to the writable snapshot is a volume filter driver.

13. The method of claim 6, wherein the dedicated filter driver to track any changes to the writable snapshot is a file system filter driver.

* * * * *